US009446668B2

(12) United States Patent
Bachmaier et al.

(10) Patent No.: US 9,446,668 B2
(45) Date of Patent: Sep. 20, 2016

(54) DRIVE METHOD WITH SHIFTING OF THE SWITCHING FREQUENCY AND DRIVE DEVICE

(71) Applicant: SIEMENS AKTIENGESELLSCHAFT, München (DE)

(72) Inventors: Georg Bachmaier, München (DE); Christian Bachmann, München (DE); Dominik Bergmann, Sachsenkam (DE); Marco Cyriacks, München (DE); Matthias Gerlich, München (DE); Guillaume Pais, München (DE); Alexandru Popescu, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/423,138

(22) PCT Filed: Aug. 21, 2013

(86) PCT No.: PCT/EP2013/067372
§ 371 (c)(1),
(2) Date: Feb. 23, 2015

(87) PCT Pub. No.: WO2014/033026
PCT Pub. Date: Mar. 6, 2014

(65) Prior Publication Data
US 2015/0224880 A1   Aug. 13, 2015

(30) Foreign Application Priority Data
Aug. 27, 2012   (DE) .................. 10 2012 215 152

(51) Int. Cl.
*B60L 3/00* (2006.01)
*B60L 11/18* (2006.01)
(Continued)

(52) U.S. Cl.
CPC ............. *B60L 3/003* (2013.01); *B60L 11/123* (2013.01); *B60L 11/1803* (2013.01); *H02P 5/74* (2013.01);
(Continued)

(58) Field of Classification Search
CPC ........... B60L 11/123; B60L 2240/421; B60L 2210/30; B60L 2220/42; B60L 2240/526; B60L 2210/42; H02P 5/74; Y02T 10/7077; Y02T 10/6217; Y02T 10/7241; Y02T 10/7022; Y02T 10/648
See application file for complete search history.

(56) References Cited

U.S. PATENT DOCUMENTS 5,191,273 A   3/1993   Shimamura
7,948,779 B2   5/2011   Bauer
(Continued)

FOREIGN PATENT DOCUMENTS

CH   444953 A   2/1968
CN   1063382 A   8/1992
(Continued)

OTHER PUBLICATIONS

Semail E. et al: Sensitivity of a 5-phase Brushless DC machine to the 7th harmonic of the back-electromotive force; 2004 35th Annual IEEE Power Electronics Specialists Conference; pp. 4564-4570; www.univ-lille1.fr/12ep/, Jun. 25, 2004.
(Continued)

*Primary Examiner* — Rodney Butler
(74) *Attorney, Agent, or Firm* — Schmeiser Olsen & Watts LLP

(57) ABSTRACT

A method for driving a vehicle comprising at least two motors is provided. If a plurality of motors are fed from an intermediate circuit via inverters, the current in the intermediate circuit has a plurality of harmonics (−5th, −3th, −1st, +1st, +3rd, +5th). To prevent coupling capacitors of the intermediate circuit becoming over-burdened, the switching frequency of the inverters is shifted in such a manner that the harmonics no longer fall into a resonance range.

12 Claims, 6 Drawing Sheets

(51) Int. Cl.
*H02P 27/08* (2006.01)
*H02P 5/74* (2006.01)
*B60L 11/12* (2006.01)

(52) U.S. Cl.
CPC .......... *H02P 27/085* (2013.01); *B60L 2210/30* (2013.01); *B60L 2210/42* (2013.01); *B60L 2220/42* (2013.01); *B60L 2240/421* (2013.01); *B60L 2240/526* (2013.01); *Y02T 10/6217* (2013.01); *Y02T 10/648* (2013.01); *Y02T 10/7022* (2013.01); *Y02T 10/7077* (2013.01); *Y02T 10/7241* (2013.01)

(56) References Cited

U.S. PATENT DOCUMENTS

| | | | |
|---|---|---|---|
| 8,288,886 | B2 | 10/2012 | Anwar et al. |
| 2002/0027789 | A1 | 3/2002 | Okushima et al. |
| 2011/0025240 | A1* | 2/2011 | Furukawa ............ B60L 11/1803 318/400.3 |
| 2011/0266992 | A1* | 11/2011 | Nishiguchi ........... B60L 11/123 318/807 |

FOREIGN PATENT DOCUMENTS

| | | |
|---|---|---|
| CN | 101964590 A | 2/2011 |
| JP | h04200299 a | 7/1992 |
| JP | H1118435 A | 1/1999 |
| JP | 2002084790 A | 3/2002 |
| JP | 2004032938 A | 1/2004 |
| JP | 2005210861 a | 8/2005 |
| JP | 2009060691 A | 3/2009 |

OTHER PUBLICATIONS

International Search Report PCT/EP2013/067372; International File Date: Aug. 21, 2013; 3 pgs.
Chinese Office Action dated Apr. 5, 2016; Application No. 201380056101.4; Application Date: Aug. 21, 2013; 18 pgs.

* cited by examiner

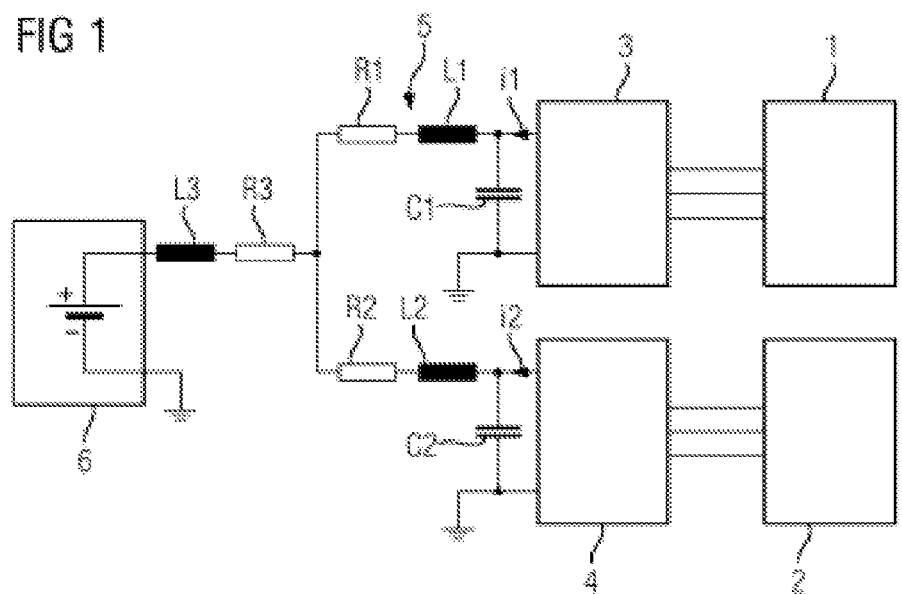
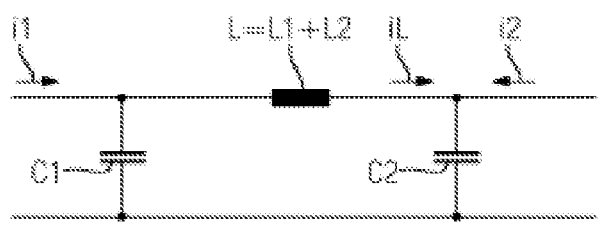

DRIVE METHOD WITH SHIFTING OF THE SWITCHING FREQUENCY AND DRIVE DEVICE

CROSS-REFERENCE TO RELATED APPLICATIONS

This application claims priority to PCT Application No. PCT/EP2013/067372, having a filing date of Aug. 21, 2013, based on DE 102012215152.4 having a filing date of Aug. 27, 2012, the entire contents of which are hereby incorporated by reference.

FIELD OF TECHNOLOGY

The following relates to a method for driving a vehicle comprising at least two motors by actuating each of the motors with in each case one actuation signal, which has a respective electrical motor frequency, by means of in each case one inverter, and supplying current from a current source to the inverters via a DC link, which has a resonant frequency. The inverters have a common switching frequency, and, in the DC link, spectral components of the current flowing there occur, said spectral components having harmonics of the electrical motor frequencies around the switching frequency. Furthermore, embodiments of the present invention relates to a corresponding drive device for a vehicle.

BACKGROUND

There are electrically operated vehicles with two electric motors provided in the drive train of said vehicles, which electric motors are controlled separately from one another. Therefore, the motor speeds and therefore also the electrical motor frequencies are not necessarily the same.

A drive device like that on which the present invention is based is illustrated in FIG. 1. The drive train in this case has, by way of example, two motors 1 and 2. Both motors are in this case in the form of three-phase motors. For actuation of the motors 1 and 2, two inverters 3 and 4 are used. The inverters 3 and 4 are fed via a DC link 5 from a battery 6 or another current source. In accordance with the equivalent circuit diagram illustrated in FIG. 1, the feedline to the inverter 3 has a resistance R1 and a line inductance L1. A coupling capacitance C1, which counts as part of the DC link 5, is connected upstream of the inverter 3. The feedline to the inverter 4 has an ohmic resistance R2 and a line inductance L2. A coupling capacitance C2 is connected upstream of the second inverter 4.

The DC link 5 is fed by a battery 6 with a battery inductance L3 and an internal resistance R3. However, for the further considerations, the ohmic resistances R1 to R3 are not taken into consideration. In addition, the battery inductance L3 is so high that it can be left out of the equation with respect to the line inductances L1 and L2 for the high dynamic range.

Owing to the above simplifications, the simplified circuit diagram of the DC link 5 illustrated in FIG. 2 results. FIG. 2 shows a series circuit comprising the capacitance C1 and an inductance L, wherein the capacitance C2 is connected in parallel with the series circuit. The inductance L corresponds to the sum of the line inductances L1 and L2. The current i1 leaving the first inverter 3 flows into the node between the capacitance C1 and the inductance L (cf. FIG. 1). Furthermore, a current i2 leaving the second inverter 4 flows into the node between the inductance L and the capacitance C2. A current iL flows through the inductance L.

The system shown in FIG. 2 has a resonant frequency, which can be seen from the system response in FIG. 3. This resonant frequency is, for example, 5.3 kHz if the line inductances are 1.5 µH and the inverter capacitances C1 and C2 are each 600 µF. In fact, the resonance in the system is damped by the ohmic resistances.

In the case under consideration, the inverters 3 and 4 generate pulse-width-modulated (PWM) actuation signals for the motors 1 and 2. The PWM frequency is 8 kHz, for example. Since this frequency is in the vicinity of the resonant frequency of the DC link, some spectral components of the PWM signals of the inverters 3 and 4 are also close to the resonant frequency. These signal components are amplified corresponding to the system response in FIG. 3. These undesired amplifications subject the DC link or input capacitances C1 and C2 to a load. They therefore need to be dimensioned correspondingly. In addition, considerable power losses arise owing to the undesired amplifications or peak values of magnification.

In the system shown in FIG. 1, substantially three oscillations with their harmonics occur during operation. Firstly, this is the frequency 8 kHz, at which the inverter is operated, for example. Secondly, the motors are operated, for example, at an average electrical speed of 120 Hz. Owing to non-ideal phenomena in the inverters and motors, a harmonic which corresponds to six times the frequency of the electrical motor frequency and is therefore 720 Hz in the selected example therefore results in the DC link. Furthermore, a third oscillation arises owing to the fact that the two motors have a speed difference of 20 Hz, for example.

In order to better understand the spectrum of the current iL flowing in the DC link, the following analysis is based on a dynamic model. Only the high frequencies are represented therein. The inverter operates at a fixed pulse frequency of 8 kHz. As a result of nonlinearities in the inverter/motor system, the frequency of 8 kHz acts as modulation carrier of the current signal.

The PWM frequency of an inverter can be noted as $$\omega_{INV} = 2 \cdot \pi \cdot 8000.$$

The electrical motor frequency is denoted by $\omega_{MOTOR}$. The direct current for a motor then results as $$i(t) = A\sin(\omega_{INV} \cdot t + \varphi_{INV}) \cdot \sin(6 \cdot \omega_{MOTOR} \cdot t + 6 \cdot \varphi_{MOTOR})$$

$$i(t) = \frac{A}{2}[\cos(\omega_{INV} \cdot t - 6 \cdot \omega_{MOTOR} \cdot t + \varphi_{INV} - 6\varphi_{MOTOR}) - \cos(\omega_{INV} \cdot t + 6 \cdot \omega_{MOTOR} \cdot t + \varphi_{INV} + 6 \cdot \varphi_{MOTOR})]$$

Accordingly, a motor generates two harmonics as shown in the above cosine arguments. These result from a multiplication of the sinusoidal values of the inverter frequencies and the motor frequencies.

Each of the motors in the drive system or the drive device generates such a current i1 and i2 as is also indicated in FIGS. 1 and 2. Both currents are summed in directionally dependent fashion so that the following total current results:

$$i(t) = i_1(t) - i_2(t).$$

Finally, in each case two harmonics around the switching frequencies $\phi_{INV\,1}$ and $\phi_{INV\,2}$ of the inverters result:

$$\omega_1 = \omega_{INV\ 1} - 6 \cdot \omega_{MOTOR\ 1}$$

$$\omega_2 = \omega_{INV\ 1} - 6 \cdot \omega_{MOTOR\ 1}$$

$$\omega_3 = \omega_{INV\ 2} - 6 \cdot \omega_{MOTOR\ 2}$$

$$\omega_4 = \omega_{INV\ 2} - 6 \cdot \omega_{MOTOR\ 2}$$

The following simulation shows the currents iL occurring in the DC link in the time range. The frequencies are selected as follows:

$$f_{INV\ 1} = 81\ \text{kHz}$$

$$f_{MOTOR\ 1} = 116.7\ \text{Hz}$$

$$f_{INV\ 2} = 8\ \text{kHz}$$

$$f_{MOTOR\ 2} = 118.7\ \text{Hz}$$

The frequencies of both inverters are in this case selected to be the same, therefore, with the result that there is a common switching frequency for the inverters. The electrical motor frequencies differ by 20 Hz.

FIGS. 4 and 5 show the simulated current signal iL on the basis of the above frequencies. In this case, FIG. 5 shows the segment between 0.04 s and 0.05 s shown in FIG. 4 on an enlarged scale.

There, the detailed structure of the signal and in particular the switching frequency of the inverters can also be seen.

The spectrum of the simulated signal is reproduced in FIG. 6. In said Figure, essential spectral components at 7300 Hz and 8700 Hz are shown. These spectral components originate from the motor speeds which produce a frequency of 700 Hz. Together with the PWM frequency of the inverters of 8 kHz, the following results: 8000 Hz−700 Hz=7300 Hz and 8000 Hz+700 Hz=8700 Hz.

As shown by the enlarged detail of the spectrum from FIG. 7, the small difference in the motor speeds results in two different spectral lines. One spectral line is actually 7300 Hz, while the other is 12 Hz below this, with a value of 7288 Hz.

If higher odd-order harmonics which are caused by the motor frequencies around the switching frequency are also taken into consideration in the simulation, the spectrum illustrated in FIG. 8 results. In this case, based on the frequency of 700 Hz which is brought about by the motor frequencies or the average motor frequency, odd harmonics result on the left-hand and right-hand side of the switching frequency of 8 kHz. In particular, the positive harmonics "+1st", "+3rd", "+5th" etc. arise on the right-hand side of the switching frequency. The negative harmonics "−1st", "−3rd", "−5th" etc. result on the left-hand side.

These frequencies are generally not a problem as long as they are not in the vicinity of the resonant frequency of the system or the DC link as shown in FIG. 3. If, however, the motor speeds change, the harmonic frequencies also change, and it may arise that one of these harmonic frequencies enters the resonance range and is amplified there excessively. The components of the drive device then need to withstand this excess current increase and, in addition, power losses arise as a result.

SUMMARY

An aspect relates to a method for driving a vehicle with which lower power losses can be realized and which makes it possible to dimension the components so as to be smaller.

Another aspect relates to a method for driving a vehicle comprising at least two motors by actuating each of the motors with in each case one actuation signal, which has a respective electrical motor frequency, by means of in each case one inverter, and supplying current from a current source to the inverters via a DC link, which has a resonant frequency, wherein the inverters each have a switching frequency, and in the DC link, spectral components of the current flowing there occur, said spectral components having harmonics around the respective switching frequency which result from the electrical motor frequencies, wherein the switching frequency of each inverter is set or controlled in such a way that at least one of the harmonics around the respective switching frequency always has at least one presettable spacing from the resonant frequency.

Furthermore, embodiments of the invention provides a drive device for a vehicle comprising at least two inverters for actuating in each case one motor with in each case one actuation signal, which has a respective electrical motor frequency, and a DC link, via which current can be supplied to the at least two inverters from a current source and which has a resonant frequency, wherein the at least two inverters each have a switching frequency, and in the DC link, spectral components of the current flowing there occur during operation, said spectral components having harmonics around the respective switching frequency which result from the electrical motor frequencies, wherein the switching frequency of the inverters is set or controlled in such a way that at least one of the harmonics around the respective switching frequency always has at least one presettable spacing from the resonant frequency.

Advantageously, therefore, in the case of the inverters the switching frequencies or the common switching frequency is/are shifted. Owing to the shifting, a preset spacing with respect to the resonant frequency of the DC link (which also includes the coupling capacitances of the inverters) is ensured. This preset spacing may be a minimum spacing which can also be overshot during shifting. Thus, it is possible to achieve a situation whereby a resonance range at or around the resonant frequency of the DC link is kept free of the harmonics. As a result, no excessively increased currents occur and the coupling capacitors of the inverters can be provided with smaller dimensions. In addition, fewer power losses occur.

Preferably, a region on both sides around the resonant frequency is provided by the presettable spacing, which region is kept free of the at least one harmonic. As a result, a minimum spacing on both sides of the resonant frequency is preset which needs to be maintained by the harmonics.

The at least one harmonic may be the first harmonic brought about by the electrical motor frequencies. This first harmonic results from six times the respective electrical motor frequency.

Furthermore, the switching frequency of each inverter can be set or controlled in such a way that all of the first harmonics around the switching frequency always have in each case a presettable spacing from the resonant frequency. This means that not only the positive first harmonic but also the negative first harmonic needs to maintain the mentioned spacing.

In addition, it may also be advantageous if in addition to the first harmonic, all of the third harmonics also have in each case a presettable spacing from the resonant frequency. This should in particular be sought when the third harmonics have such high amplitudes that they subject the coupling capacitors of the inverters to excessively high loading at the peak value of magnification.

In this context, it may also be advantageous for the switching frequency of each inverter to be only changed when the first and third harmonics around the switching frequency do not maintain the respectively presettable spacing. That is to say that, if, for example, the fifth or higher harmonics have such a low amplitude that they do not subject the coupling capacitors of the inverters to excessive loading owing to the peak value of magnification, it is possible to dispense with the changing of the switching frequencies of the inverters when the fifth or higher harmonics enter the region of the resonant frequency.

It is particularly preferred if the presettable spacing is selected depending on an amplitude of the respective spectral component. Typically, the first harmonics have a higher amplitude than the third harmonics. In this case, the minimum spacing of the third harmonics to be maintained with respect to the resonant frequency is smaller than that of the first harmonics since the third harmonics can then be more amplified than the first harmonics without causing negative consequences.

The actuation signals of the motors can be pulse-width-modulated signals. Thus, embodiments of the present invention can be used for conventional inverters.

Owing to the abovementioned method steps, indirectly means are also defined by which these method steps can be implemented and which can be part of a corresponding drive device.

BRIEF DESCRIPTION

Some of the embodiments will be described in detail, with reference to the following figures, wherein like designations denote like members, wherein:

FIG. 1 shows a schematic of a drive device for a vehicle comprising two motors, which can also be a basis for the present invention;

FIG. 2 shows a simplified circuit diagram of the DC link shown in FIG. 1;

DETAILED DESCRIPTION

The exemplary embodiments detailed below represent preferred embodiments of the present invention.

A method according to embodiments of the invention is based on that which has been explained above in connection with FIGS. 1 to 8. Therefore, reference is made to the description relating to these Figures. In addition, the inverters 3, 4 are designed to be able to automatically change their switching frequency or such that they are actuated in such a way that their switching frequency changes. Therefore, the inverter frequency (for example the PWM frequency or another digital modulation frequency) is changed in order that the resonant frequency of the DC link is not excited. This method can be used for two or more switching inverters.

As has been illustrated at the outset, the frequencies in the DC link are dependent on the electrical motor frequencies $\omega_{MOTOR}$ and on the inverter or switching frequency $\omega_{INV}$. In this case, the following harmonic frequencies (also referred to below as "harmonics brought about by motor frequencies") are generated on the DC side by each inverter:

$$\omega_{2k+1} = \omega_{INV} + (2k+1) \cdot 6 \cdot \omega_{MOTOR}$$

$$k \in Z$$

In this case, therefore, k is a positive or negative integer, including 0.

Figure 3:
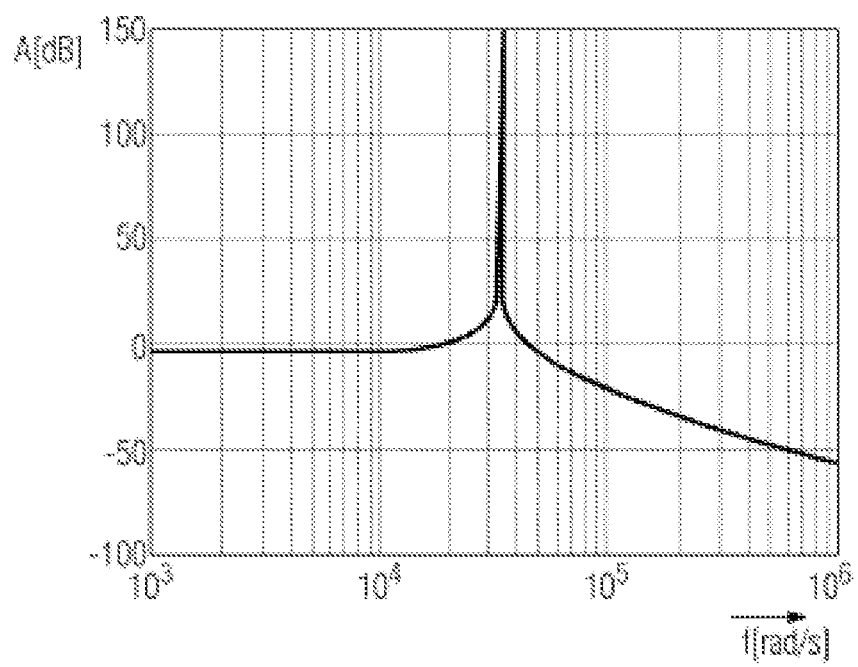
FIG. 3 shows a transfer function of the DC link in FIG. 2.
Figure 4:
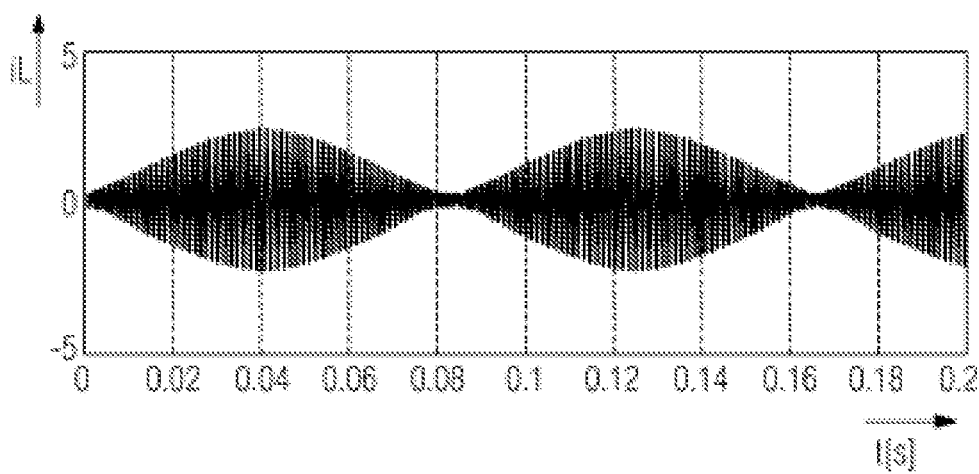
FIG. 4 shows a simulated current profile in the DC link.
Figure 5:
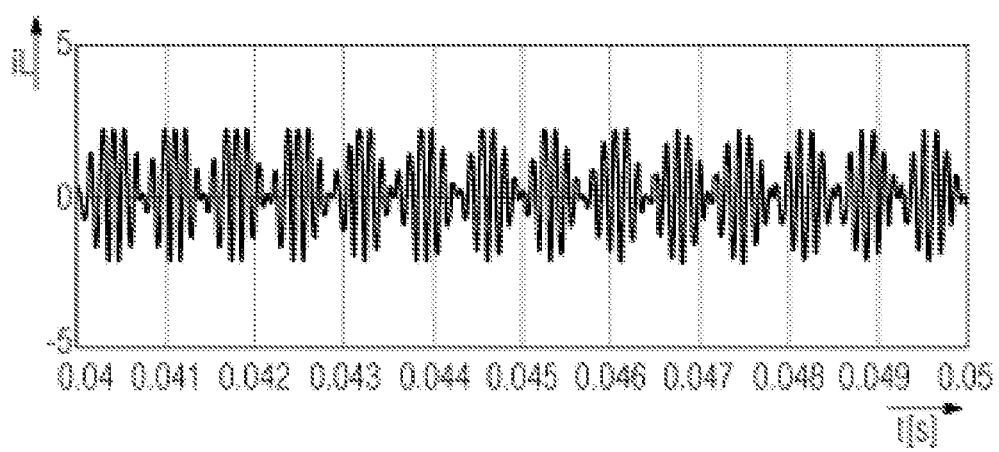
FIG. 5 shows an enlarged detail of the signal shown in FIG. 4.
Figure 6:
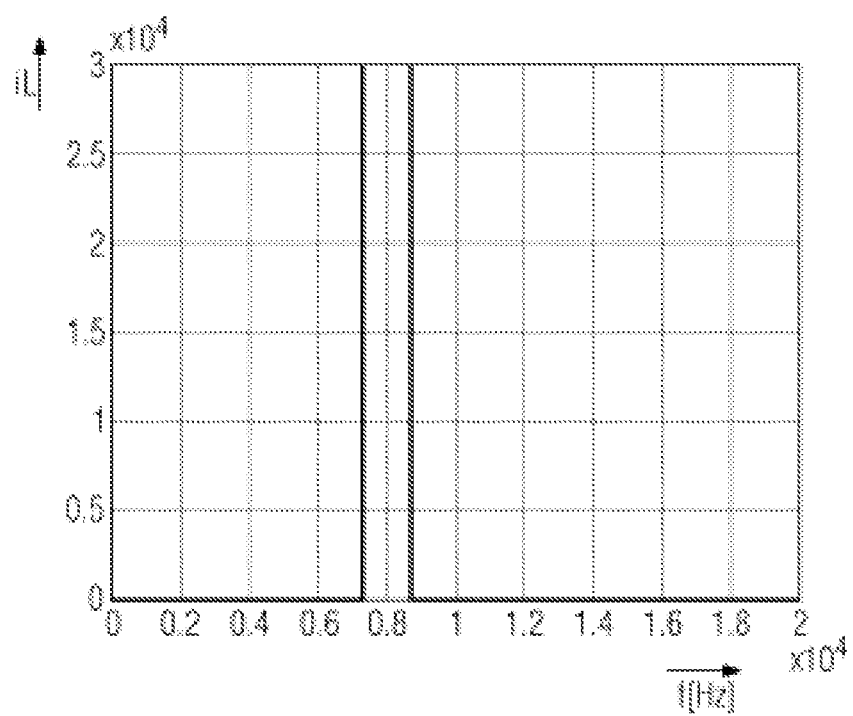
FIG. 6 shows the spectrum with respect to the signal shown in FIG. 4.
Figure 7:
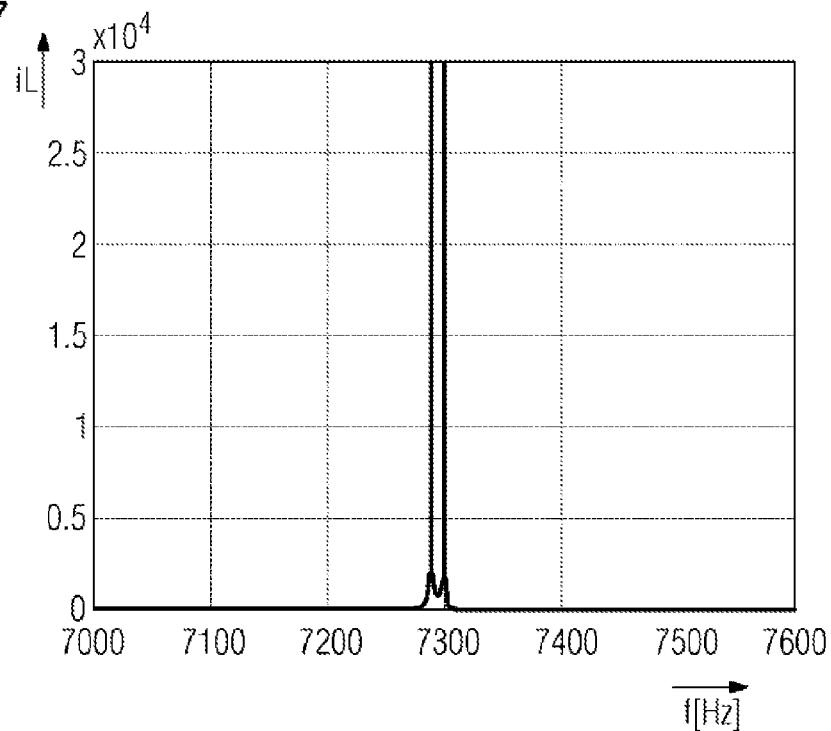
FIG. 7 shows a detail of the spectrum shown in FIG. 6.
Figure 8:
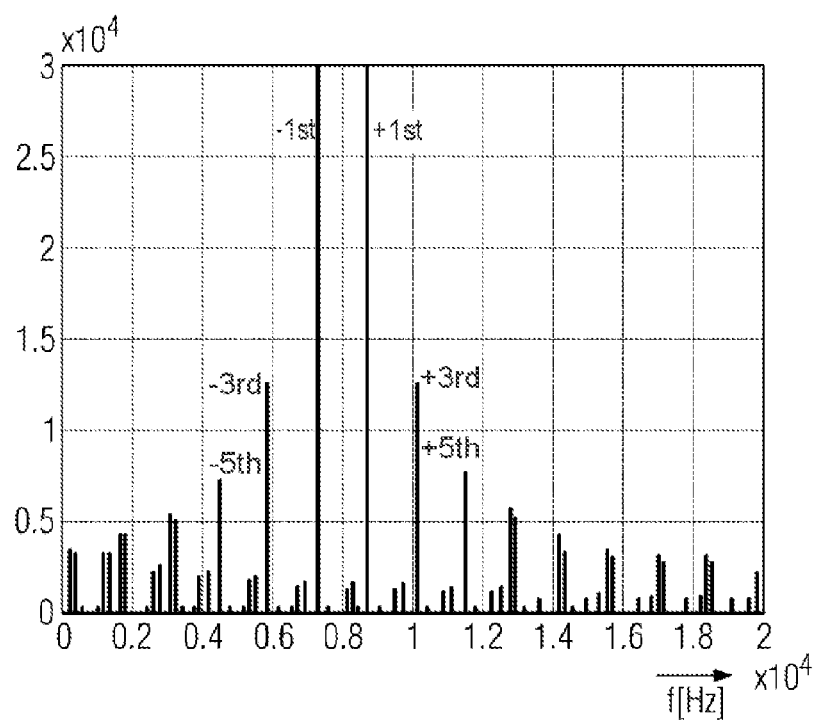
FIG. 8 shows a spectrum of a simulated signal having a plurality of harmonics.

Around the resonant frequency of the DC link, a region can be defined which needs to be kept free of any harmonics which are defined by the above formula. These harmonics which are on both sides of the switching frequency $\omega_{INV}$ are illustrated in FIG. 8, as mentioned.

The basic concept now consists in keeping a preset or presettable region around the resonant frequency free of any harmonics. In other words: a minimum spacing between a harmonic and the resonant frequency should be ensured.

In order now to avoid the region which is forbidden or to be kept free, therefore, the PWM frequency is changed in the following example. The variables of the example in the introductory part of the description are also transferred as follows for the following example:

$$C1 = C2 = 600 \text{ μF}$$

$$L = 1.5 \text{ μH}$$

Again the resonant frequency of the DC link is thus 5.3 kHz.

The switching frequency used for both inverters is 8 kHz.

Measurements on the drive train of an electric vehicle have shown that substantially only the first, third and fifth harmonics are of significance. Therefore, only these harmonics are taken into consideration below.

The vehicle velocity is coupled directly to the motor speed and therefore also to the motor frequency, for example. The range of the electrical motor frequency can be between 0 and 300 Hz. If the electrical motor frequency is 150 Hz, for example, the following frequencies or harmonics result in the spectrum of the DC link:

$$\omega_{-5} = 8000 - 5 \cdot 6 \cdot 150 = 3500 \text{ Hz}$$

$$\omega_{-3} = 8000 - 3 \cdot 6 \cdot 150 = 5300 \text{ Hz}$$

$$\omega_{-1} = 8000 - 1 \cdot 6 \cdot 150 = 7100 \text{ Hz}$$

$$\omega_{1} = 8000 + 1 \cdot 6 \cdot 150 = 8900 \text{ Hz}$$

$$\omega_{3} = 8000 + 3 \cdot 6 \cdot 150 = 10700 \text{ Hz}$$

$$\omega_{5} = 8000 + 5 \cdot 6 \cdot 150 = 12500 \text{ Hz}.$$

Figure 9:
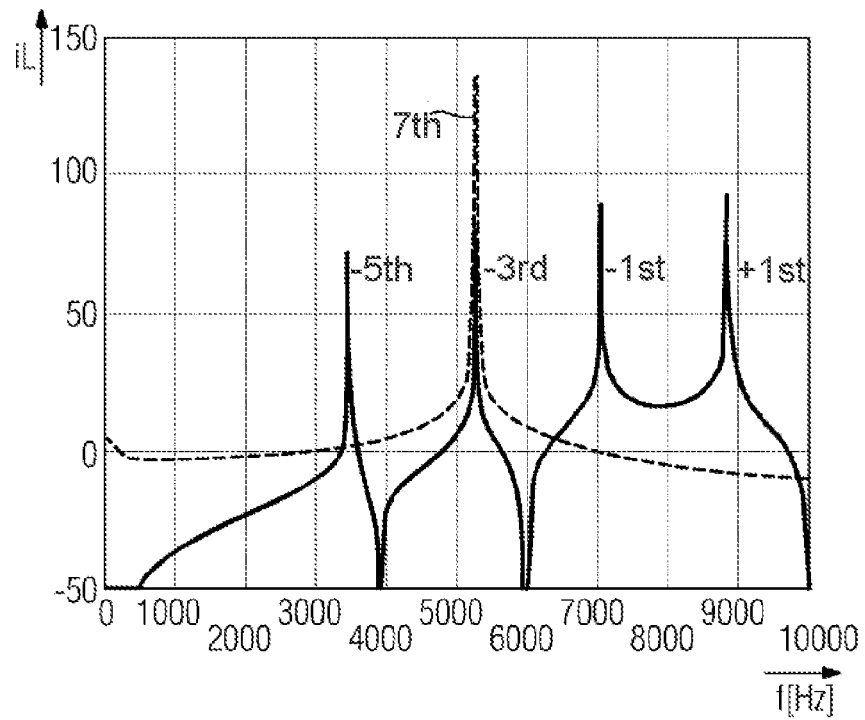
FIG. 9 shows a harmonic in the resonance region.

This means that the negative third harmonic is in the resonance region 7 of the DC link, which is also illustrated in FIG. 9. A forbidden region between 5.1 kHz and 5.5 kHz is now defined, for example. This means that a harmonic of the current in the DC link should not be within this range, i.e. it should maintain a minimum spacing of 200 Hz on both sides of the resonant frequency. This rule can apply only for the first harmonic or the first and third harmonics or the first, third and fifth harmonics etc., for example.

Figure 10:
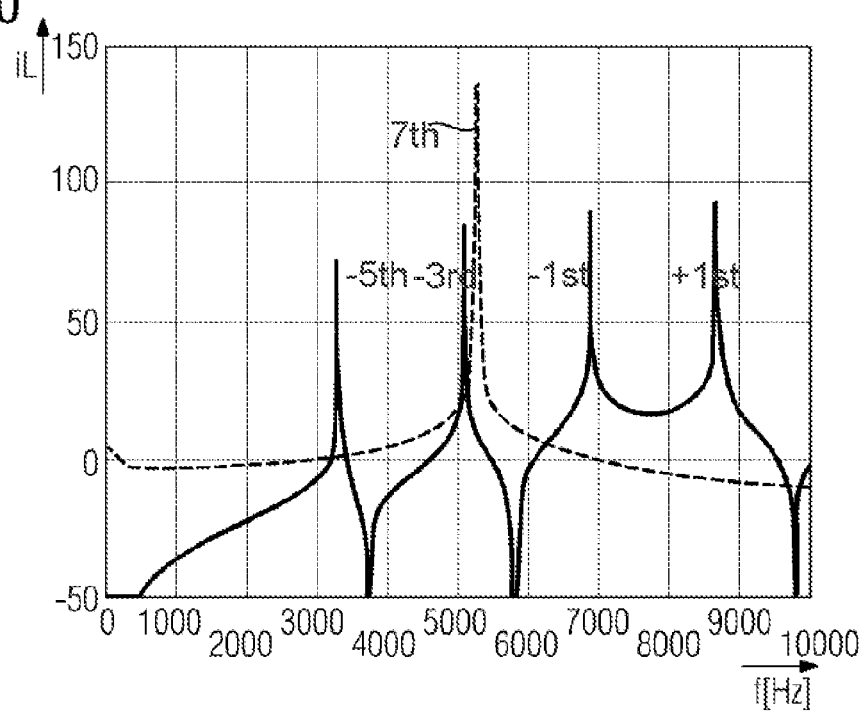
FIG. 10 shows a harmonic which has been shifted downwards out of the resonance region.

If the PWM frequency is now changed by 200 Hz, the negative third harmonic would be shifted sufficiently in order to move out of the resonance range 7. Normally, the inverter frequency would be reduced by 200 Hz from 8 kHz to 7.8 kHz in order to reduce the losses in the inverter or inverters. As a result, the spectrum shown in FIG. 10 would be set. It can be seen that the negative third harmonic is arranged below the resonance range 7. It is then at $\omega_{-3} = 7800 - 3 \cdot 6 \cdot 150 = 5100$ Hz.

Alternatively, the PWM frequency can naturally also be shifted upwards by 200 Hz to 8.2 kHz in order to obtain a better sinewave of the signal, for example. The negative third harmonic is then at $\omega_{-3} = 8200 - 3 \cdot 6 \cdot 150 = 5500$ Hz.

Figure 11:
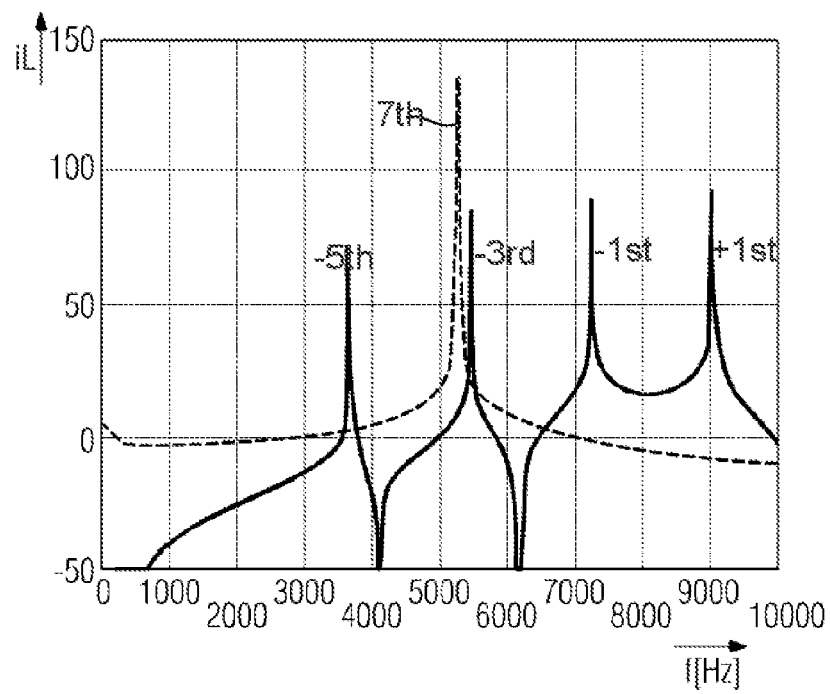
FIG. 11 shows a harmonic which has been shifted upwards out of the resonant region.

As shown in FIG. 11, the negative third harmonic is then above the forbidden resonance range 7. It is therefore possible to avoid a situation whereby the system is excited into resonance without any change to the hardware.

Figure 12:
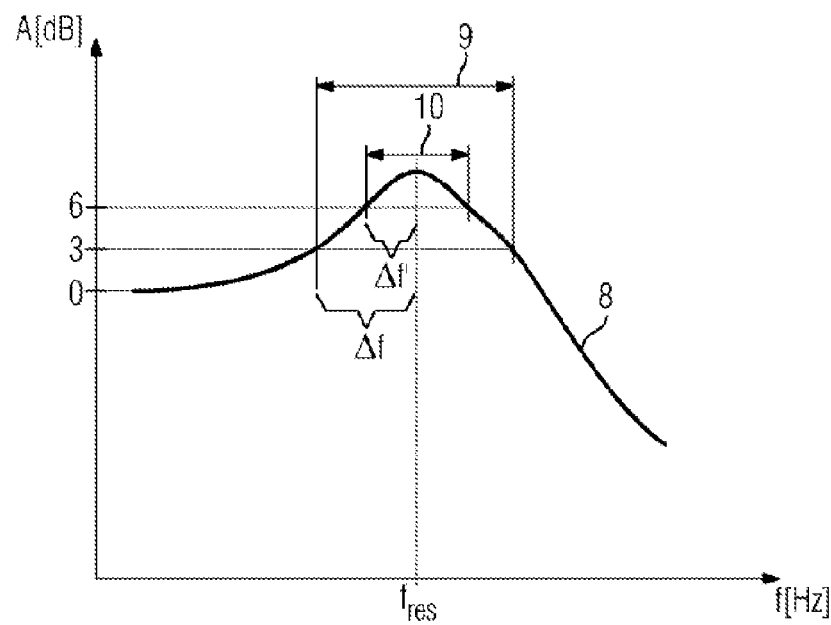
FIG. 12 shows different free regions around the resonant frequency.

FIG. 12 shows more precisely how the presettable spacing of the harmonics from the resonant frequency $f_{res}$ can be defined. As in FIG. 3, a transfer function 8 is also illustrated here specifically in the region of the resonant frequency $f_{res}$. The first harmonic of the current signal in the DC link should be amplified at most by 3 dB, for example. This results in a region 9 around the resonant frequency which cannot be entered by the first harmonic. This region 9 may be symmetrical or unsymmetrical with respect to the resonant frequency $f_{res}$. In the symmetrical case, the region therefore extends from $f_{res} - \Delta f$ to $f_{res} + \Delta f$ where $\Delta f$ indicates the spacing with respect to the resonant frequency $f_{res}$ which at least needs to be maintained. In the unsymmetrical case, the spacing from the resonant frequency $f_{res}$ which at least needs to be maintained on the left-hand side is greater than the spacing which at least needs to be maintained on the right-hand side, for example.

If a harmonic is allowed to be amplified by 6 dB, for example, it is allowed to come closer to the resonant frequency. Accordingly, the forbidden region 10 is also smaller than the region 9 when an amplification of only 3 dB is allowed. Correspondingly, the minimum spacing $\Delta f'$ is then also less than $\Delta f$.

The forbidden region 9, 10 can be defined differently for each harmonic. For example, it can be made dependent on the amplitude of the harmonic. If, therefore, the amplitude of the first harmonic is greater than that of the third harmonic, the third harmonic can come closer to the resonant frequency without a preset maximum current being exceeded.

The forbidden region 9, 10 can, however, also be made dependent on the total power required by the inverter(s). That is to say that if, for example, a low power is required, a harmonic can come closer to the resonant frequency without a critical current intensity being exceeded. Conversely in the case of a high required power, a harmonic needs to be kept further away from the resonant frequency.

Since, therefore, in accordance with the above examples, the possibility of a critical current intensity in the DC link being exceeded is prevented, the coupling capacitances of the inverters are subjected to less loading and can therefore be dimensioned for lower current intensities or powers.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for driving a vehicle comprising at least two motors, each of the at least two motors having an inverter, the method comprising:
    actuating, by the inverter, the at least two motors with one actuation signal, which has a respective electrical motor frequency; and
    supplying current from a current source to the inverter via a DC link, which has a resonant frequency, wherein the inverter has a switching frequency,
    wherein, a plurality of spectral components of the current flowing in the DC link occur during operation, the plurality of spectral components having a plurality of harmonics around the respective switching frequency which result from the electrical motor frequencies, further wherein the switching frequency of the inverter is set or controlled in such a way that at least one harmonic of the plurality of harmonics around the respective switching frequency always has at least one presettable spacing from the resonant frequency.

2. The method as claimed in claim 1, wherein a region on both sides around the resonant frequency is provided by the presettable spacing, the region being kept free of the at least one harmonic.

3. The method as claimed in claim 1, wherein the at least one harmonic is a first harmonic, which is brought about by the electrical motor frequencies.

4. The method as claimed in claim 3, wherein the switching frequency of the inverter is set or controlled in such a way that all of the first harmonics around the switching frequency always have a presettable spacing from the resonant frequency.

5. The method as claimed in claim 4, further comprising a third harmonic, wherein, in addition to the first harmonics, all of the third harmonics also have a presettable spacing from the resonant frequency.

6. The method as claimed in claim 1, wherein the switching frequency of the inverters is only changed when the first harmonics and the third harmonics of the electrical motor frequency around the switching frequency do not maintain the respectively presettable spacing.

7. The method as claimed in claim 1, wherein the presettable spacing is selected depending on an amplitude of the respective spectral component of the plurality of spectral components.

8. The method as claimed in claim 7, wherein the presettable spacing is greater for a first harmonic than for a third harmonic.

9. The method as claimed in claim 1, wherein the actuation signals of the motors are pulse-width-modulated signals.

10. A drive device for a vehicle comprising
    at least two inverters for actuating a plurality of motors with, one actuation signal, which has a respective electrical motor frequency; and
    a DC link, via which current is supplied to the at least two inverters from a current source and which has a resonant frequency, wherein the at least two inverters each have a switching frequency, and
    wherein, a plurality of spectral components of the current flowing in the DC link occur during operation, the plurality of spectral components having a plurality of harmonics around the respective switching frequency, which result from the electrical motor frequencies, wherein the switching frequency of the at least two inverters is set or controlled in such a way that at least one of the plurality of harmonics around the respective switching frequency always has at least one presettable spacing from the resonant frequency.

11. The method of claim 1, wherein a frequency of the at least one harmonic is shifted by controlling the switching frequency to achieve the at least one presettable spacing from the resonant frequency.

12. The drive vehicle of claim 10, wherein a frequency of the at least one harmonic is shifted by controlling the switching frequency to achieve the at least one presettable spacing from the resonant frequency.

* * * * *